(12) United States Patent
Herzog et al.

(10) Patent No.: US 8,877,835 B2
(45) Date of Patent: Nov. 4, 2014

(54) HEAT-ACTIVATABLE FREE-RADICAL INITIATORS AND COMPOSITE MATERIAL WHICH COMPRISES MAGNETIC PARTICLES

(75) Inventors: Harald Herzog, Karlstein (DE); Konrad Rockstein, Engleskirchen (DE); Stipan Katusic, Bad Soden (DE); Martin Kunz, Dettenhausen (DE); Iris Nagl, Munich (DE); Hanno Wolf, Ottobrunn (DE)

(73) Assignees: Evonik Degussa GmbH, Essen (DE); United Initiatiors GmbH & Co. KG, Pullach (DE)

( * ) Notice: Subject to any disclaimer, the term of this patent is extended or adjusted under 35 U.S.C. 154(b) by 109 days.

(21) Appl. No.: 13/379,868

(22) PCT Filed: May 28, 2010

(86) PCT No.: PCT/EP2010/057376
§ 371 (c)(1),
(2), (4) Date: Feb. 8, 2012

(87) PCT Pub. No.: WO2010/149463
PCT Pub. Date: Dec. 29, 2010

(65) Prior Publication Data
US 2012/0130023 A1    May 24, 2012

(30) Foreign Application Priority Data

Jun. 23, 2009  (DE) ................. 10 2009 027 091

(51) Int. Cl.

| | | |
|---|---|---|
| *C08K 9/00* | (2006.01) | |
| *B82Y 30/00* | (2011.01) | |
| *C08F 4/00* | (2006.01) | |
| *C01G 49/08* | (2006.01) | |
| *C01G 49/06* | (2006.01) | |
| *C04B 35/628* | (2006.01) | |
| *C01G 5/00* | (2006.01) | |
| *C08J 3/24* | (2006.01) | |
| *H01F 1/37* | (2006.01) | |
| *C01G 51/00* | (2006.01) | |
| *C01G 49/00* | (2006.01) | |
| *C09C 3/12* | (2006.01) | |
| *C08F 4/32* | (2006.01) | |
| *C01G 49/10* | (2006.01) | |

(52) U.S. Cl.
CPC . *C08F 4/32* (2013.01); *B82Y 30/00* (2013.01); *C08F 4/00* (2013.01); *C01G 49/08* (2013.01); *C01G 49/06* (2013.01); *C01P 2004/84* (2013.01); *C04B 35/62897* (2013.01); *C04B 2235/3272* (2013.01); *C01G 5/00* (2013.01); *C08J 3/24* (2013.01); *C01P 2004/88* (2013.01); *H01F 1/37* (2013.01); *C04B 2235/5454* (2013.01); *C01G 51/00* (2013.01); *C04B 35/62807* (2013.01); *C01P 2002/32* (2013.01); *C01G 49/0072* (2013.01); *C09C 3/12* (2013.01); *C01P 2006/42* (2013.01); *C01P 2004/64* (2013.01); *C01P 2006/12* (2013.01); *C01G 49/0036* (2013.01); *C01G 49/10* (2013.01); *C04B 2235/5409* (2013.01); *C04B 35/62884* (2013.01); *Y10S 977/779* (2013.01)
USPC ......... 523/216; 524/442; 252/62.54; 977/779

(58) Field of Classification Search
USPC ......... 523/216; 524/442; 252/62.54; 977/779
See application file for complete search history.

(56) References Cited

U.S. PATENT DOCUMENTS

| | | | |
|---|---|---|---|
| 3,181,991 A | 5/1965 | Leveskis | |
| 4,211,664 A * | 7/1980 | Dixon et al. | 252/62.54 |
| 5,160,761 A * | 11/1992 | Koga et al. | 427/548 |
| 5,268,440 A * | 12/1993 | Luft et al. | 526/352.2 |
| 2002/0009661 A1* | 1/2002 | Hashimoto et al. | 430/106.1 |
| 2002/0164502 A1* | 11/2002 | Hayashi et al. | 428/694 BA |
| 2003/0059603 A1 | 3/2003 | Gottfried et al. | |
| 2005/0230656 A1* | 10/2005 | Umemoto et al. | 252/62.63 |
| 2006/0105170 A1* | 5/2006 | Dobson et al. | 428/403 |
| 2008/0129462 A1* | 6/2008 | Vignola et al. | 340/10.1 |
| 2011/0006247 A1* | 1/2011 | Katusic et al. | 252/62.59 |
| 2011/0147641 A1 | 6/2011 | Meyer et al. | |
| 2011/0207869 A1 | 8/2011 | Katusic et al. | |
| 2012/0080637 A1* | 4/2012 | Herzog et al. | 252/62.54 |

FOREIGN PATENT DOCUMENTS

| | | |
|---|---|---|
| CN | 101 559 343 | 10/2009 |
| EP | 1 284 485 | 2/2003 |
| EP | 2 000 439 | 12/2008 |
| JP | 2004 063517 | 2/2004 |
| JP | 2008-521747 | 6/2008 |
| JP | 2009-120634 | 6/2009 |
| WO | 01 28771 | 4/2001 |
| WO | WO 2006/058689 A1 | 6/2006 |

OTHER PUBLICATIONS

Machine Translation of JP 2004-063517 (2004).*
International Search Report Based Issued Jul. 20, 2010 in PCT/EP10/57376 Filed May 28, 2010.
U.S. Appl. No. 13/989,981, filed May 28, 2013, Katusic, et al.

* cited by examiner

Primary Examiner — Hannah Pak
(74) Attorney, Agent, or Firm — Oblon, Spivak, McClelland, Maier & Neustadt, L.L.P.

(57) ABSTRACT

Composite material comprising—one or more heat-activatable free-radical initiators selected from the group consisting of organic peroxides and/or initiators having labile carbon-carbon bonds and particles which have a core-shell structure and the core of which comprises one or more magnetic materials, while the shell comprises silicon dioxide.

15 Claims, No Drawings

HEAT-ACTIVATABLE FREE-RADICAL INITIATORS AND COMPOSITE MATERIAL WHICH COMPRISES MAGNETIC PARTICLES

The invention relates to a composite material which comprises heat-activatable free-radical initiators and magnetic particles. The invention further relates to a process for producing this material, and to its use.

Use of heat-activatable free-radical initiators for the crosslinking or hardening of polymers is a familiar practice. Organic peroxides are of the greatest importance here. The crosslinking process is thermal, and this has the disadvantage that the entire composition intended for crosslinking has to be heated, the result being uneconomic energy input. The entire composition intended for crosslinking is moreover subjected to thermal stress, and this can adversely affect its properties. Finally, the sensitive nature of peroxides should also be mentioned, and this means that particular preventive measures have to be taken during storage and during the crosslinking process.

It was therefore an object of the present invention to provide a material which permits more effective and less aggressive introduction of thermal energy into the composition intended for crosslinking. A further object consisted in provision of a process for producing this material.

The invention provides a composite material comprising
one or more heat-activatable free-radical initiators selected from the group consisting of organic peroxides and/or initiators having labile carbon-carbon bonds (C—C initiators) and
particles which have a core-shell structure and the core of which comprises one or more magnetic materials, while the shell comprises silicon dioxide.

For the purposes of the invention, composite material is a physical mixture of the components. The composite materials according to the invention can take the form of powder or paste, or liquid suspension or liquid dispersion, or can be mouldable compositions of low to high viscosity.

A feature of the composite material according to the invention is that high stability of the heat-activatable initiator has been ensured. The fall in concentration of the heat-activatable initiator is generally less than 2% of the amount of initiator used within a period of up to one month, preferably up to 6 months, particularly preferably up to 12 months and very particularly preferably a period of 2 years or more. This is all the more surprising because the particles comprise magnetic materials, and a known property of these is that they by way of example generally cause peroxides to decompose instantaneously or gradually over a prolonged period; a person skilled in the art would not therefore have considered that a composite material comprising magnetic constituents and peroxide could be produced or stored.

For the purposes of the invention, heat-activatable means that free radicals are formed thermally. The temperatures during the crosslinking of polymers are generally about 50° C. to 250° C., as a function of the free-radical initiator and of the polymer intended for crosslinking.

For the purposes of the invention, particles having a core-shell structure are particles which
are isolated individual particles surrounded by a shell,
are aggregates of accreted cores, where the aggregates have been surrounded by a shell and/or
are aggregates accreted by way of the shells.

Aggregates are individual particles firmly accreted, for example by way of sinter necks.

The shell of the particles which have core-shell structure and which are present in the composite material according to the invention can be one or more shells surrounding the core, where at least one of these shells comprises silicon dioxide or is composed to a very substantial extent thereof. If the particles having core-shell structure have a plurality of shells, it is advantageous that the exterior shell is a perforation-free shell made of silicon dioxide completely enclosing the core.

Shells located relatively close to the core do not have to be completely perforation-free. These can by way of example comprise compounds composed of the elements involved in the shell material and the elements involved in the core material. By way of example, this can be iron silicate if the core comprises iron or iron compounds.

The expression composed very substantially thereof means that in this type of instance the shell can also comprise typical contaminants. The amount of these is generally less than 1% by weight, preferably less than 0.1% by weight and particularly preferably less than 0.01% by weight, based in each case on the shell. The silicon dioxide of the shell is mainly or exclusively amorphous silicon dioxide.

The thickness of the shell is preferably in the nanometer range. A particularly preferred thickness can be from 2 to 500 nm, and a very particularly preferred thickness can be from 5 to 30 nm.

The shell is preferably substantially non-porous and has free hydroxy groups on the surface.

Magnetic materials according to the invention are paramagnetic, ferromagnetic, ferrimagnetic, or superparamagnetic materials, or a mixture of these. Preference can be given to superparamagnetic materials and materials which have only slight remanent magnetization.

Preference can be given to particles which have a core-shell structure and which exhibit not only superparamagnetic properties (Neel relaxation) but also hysteresis. These properties are dependent by way of example on chemical constitution, on particle size distribution, on the shape of the particles, and on the magnetizability thereof.

Suitable core materials can by way of example be pure metals, such as Fe, Co and Ni, oxides such as $Fe_3O_4$ and gamma-$Fe_2O_3$, spinelle-type ferromagnetic materials such as $MgFe_2O_4$, $MnFe_2O_4$ and $CoFe_2O_4$, and also alloys such as $CoPt_3$ and FePt.

In one particular embodiment of the invention, the core material comprises or consists of one or more iron oxides selected from the group consisting of hematite, magnetite and maghemite, or a mixture of two or three of these iron oxides. Particularly advantageous properties for inductive heating of the composite material according to the invention are obtained with a core material which comprises hematite, magnetite and maghemite, where X-ray diffraction diagrams determine the proportion of hematite as from 1 to 10% by weight, the proportion of magnetite as from 20 to 50% by weight and the proportion of maghemite as from 40 to 75% by weight, in each case based on the core, and the intention is that these proportions give a total of 100% by weight. In one preferred embodiment of the invention, the proportion of hematite is from 4 to 8% by weight, that of magnetite is from 35 to 40% by weight and that of maghemite is from 50 to 60% by weight.

The proportions of core material and of shell material can vary within wide limits as a function of core material, of the thickness of the shell, and of the structure of the particles, isolated or aggregated. The proportions of the core material and of the shell material are generally in each case from 10 to 90% by weight. Preference can be given to core-shell particles with a proportion of from 50 to 90% by weight of core material and from 10 to 50% by weight of shell material.

The BET surface area of the core-shell particles can be from 5 to 500 m²/g, preferably from 30 to 300 m²/g and very particularly preferably from 40 to 150 m²/g. The average diameter of the particles is preferably from 5 to 100 nm and particularly preferably from 30 to 80 nm. The 90% spread of the proportional distribution of the particles according to the invention is preferably from 5 to 60 nm.

In one particular embodiment of the invention, the particles having core-shell structure can be present in surface-modified form. For the purposes of the invention, surface-modified means that at least a portion of the hydroxy groups located on the surface of the powder have reacted with a surface modifier to form a chemical bond. The chemical bond is preferably a covalent bond, ionic bond or coordinative bond with formation of a complex between the surface modifier and the particle. A coordinative bond means formation of a complex.

The surface modifier can preferably be surface modifiers which have, as functional group, a carboxylic acid group, an acyl chloride group, an ester group, a nitrile group, an isonitrile group, a hydroxyl group, a thiol group, an epoxy group, an anhydride group, an amide group, an amino group, or a silanol group.

Particularly preferred surface modifiers are silanes which have at least one non-hydrolysable group or one hydroxy group, in particular hydrolysable organosilanes which also have at least one non-hydrolysable moiety.

Examples are silanes of the general formula $R_aSiX_{4-a}$, in which the moieties R are identical or different and are non-hydrolysable groups, the moieties X are identical or different and are hydrolysable groups or hydroxy groups, and a has the value 1, 2 or 3. The value of a is preferably 1. Examples of the hydrolysable groups X in the general formula, where these can be identical or differ from one another, are hydrogen or halogen, F, Cl, Br or I;
alkoxy, in particular $C_1$-$C_6$-alkoxy, such as methoxy, ethoxy, n-propoxy, isopropoxy and butoxy;
aryloxy, in particular $C_6$-$C_{10}$-aryloxy, such as phenoxy;
acyloxy, in particular $C_1$-$C_6$-acyloxy, such as acetoxy or propionyloxy;
alkylcarbonyl, in particular $C_2$-$C_7$-alkylcarbonyl, such as acetyl;
amino, in particular monoalkylamino or dialkylamino, preferably having in each case from 1 to 6 carbon atoms.

Preferred hydrolysable moieties are halogen, alkoxy groups and acyloxy groups. Particularly preferred hydrolysable moieties are $C_1$-$C_4$-alkoxy groups, in particular methoxy and ethoxy.

The non-hydrolysable moieties R which can be identical or differ from one another can be non-hydrolysable moieties R having or not having a functional group. By way of example, the non-hydrolysable moiety R not having a functional group can be alkyl, in particular $C_1$-$C_8$-alkyl, such as methyl, ethyl, n-propyl, isopropyl, n-butyl, sec-butyl and tert-butyl, pentyl, hexyl, octyl or cyclohexyl;
alkenyl, in particular $C_2$-$C_6$-alkenyl, such as vinyl, 1-propenyl, 2-propenyl and butenyl;
alkynyl, in particular $C_2$-$C_6$-alkynyl, such as acetylenyl and propargyl;
aryl, in particular $C_6$-$C_{10}$-aryl, such as phenyl and naphthyl, and also corresponding alkaryl moieties, such as tolyl, benzyl and phenethyl.

Explicit mention may be made of the following surface modifiers: $CH_3SiCl_3$, $CH_3Si(OC_2H_5)_3$, $CH_3Si(OCH_3)_3$, $C_2H_5SiCl_3$, $C_2H_5Si(OC_2H_5)_3$, $C_2H_5Si(OCH_3)_3$, $C_3H_7Si(OC_2H_5)_3$, $(C_2H_5O)_3SiC_3H_6Cl$, $(CH_3)_2SiCl_2$, $(CH_3)_2Si(OC_2H_5)_2$, $(CH_3)_2Si(OH)_2$, $C_6H_5Si(OCH_3)_3$, $C_6H_5Si(OC_2H_5)_3$, $C_6H_5CH_2CH_2Si(OCH_3)_3$, $(C_6H_5)_2SiCl_2$, $(C_6H_5)_2Si(OC_2H_5)_2$, $(iso-C_3H_7)_3SiOH$, $CH_2{=}CHSi(OOCCH_3)_3$, $CH_2{=}CHSiCl_3$, $CH_2{=}CH-Si(OC_2H_5)_3$, $CH_2{=}CHSi(OC_2H_5)_3$, $CH_2{=}CH-Si(OC_2H_4OCH_3)_3/CH_2{=}CH-CH_2-Si(OC_2H_5)_3$, $CH_2{=}CH-CH_2-Si(OC_2H_5)_3$, $CH_2{=}CH-CH_2Si(OOOCH_3)_3$, n-$C_6H_{13}$-$CH_2$-$CH_2$-$Si(OC_2H_5)_3$, n-$C_8H_{17}$-$CH_2CH_2$-$Si(OC_2H_5)_3$, γ-glycidyloxypropyltrimethoxysilane, γ-glycidyloxypropyltriethoxysilane, 3-isocyanatopropyl-triethoxysilane, 3-isocyanatopropyldimethylchlorosilane, 3-aminopropyltrimethoxysilane, 3-aminopropyltriethoxysilane, N-(2-aminoethyl)-3-aminopropyltrimethoxysilane, N—[N'-(2'-aminoethyl]-3-aminopropyltrimethoxysilane, hydroxymethyltriethoxysilane, 2-[methoxy(polyethyleneoxy)propyl]trimethoxysilane, bis(hydroxyethyl)-3-aminopropyltriethoxysilane, N-hydroxyethyl-N-methylaminopropyltriethoxysilane, 3-(meth)acryloxypropyltriethoxysilane and 3-(meth)acryloxypropyltrimethoxysilane.

Compounds that can preferably be used as surface modifiers are octyltrimethoxysilane, octyltriethoxysilane, hexamethyldisilazane, 3-methacryloxypropyltrimethoxysilane, 3-methacryloxypropyltriethoxysilane, dimethylpolysiloxane, glycidyloxypropyltrimethoxysilane, glycidyloxypropyltriethoxysilane, nonafluorohexyl-trimethoxysilane, tridecafluorooctyltrimethoxysilane, tridecafluorooctyltriethoxysilane and aminopropyltriethoxysilane. Very particular preference can be given to octyltrimethoxysilane, octyltriethoxysilane and dimethylpolysiloxanes.

In another particular embodiment, the particles having core-shell structure are iron silicon oxide particles, where the BET surface area of the particles is from 10 to 80 m²/g, preferably from 30 to 70 m²/g, particularly preferably from 40 to 60 m²/g;

the content of iron oxide in the particles is from 60 to 90% by weight, preferably from 75 to 85% by weight, and that of silicon dioxide is from 10 to 40% by weight, preferably from 15 to 25% by weight, based in each case on the particles including their shell(s), where the proportion of iron, silicon and oxygen is at least 99% by weight, based on the particles including their shell(s), the core is crystalline and the iron oxides comprise hematite, magnetite and maghemite;

the shell consists of amorphous silicon dioxide;

between shell and core, at least in part, there is/are one or more compounds present which consist of the elements silicon, iron and oxygen, generally being iron silicate;

the thickness of the shell is from 5 to 20 nm;

the average diameter of the particles is from 5 to 100 nm, preferably from 30 to 80 nm.

Alongside the particles with core-shell structure, the second substantive constituent of the composite material according to the invention is provided by one or more organic peroxides, C—C initiators, or a mixture of organic peroxides and of C—C initiators. Preference can be given to a composite material which comprises exclusively organic peroxides.

The organic peroxides are preferably selected from the group consisting of hydroperoxides, dialkyl peroxides, diaryl peroxides, peroxycarboxylic acids, peroxycarboxylic esters, diacyl peroxides, peroxycarbonate esters, peroxydicarbonates, ketone peroxides, perketals and/or a mixture of these. Individual mention may be made of:

hydroperoxides ($R_1$—O—O—H), such as tert-butyl hydroperoxide, cumyl hydroperoxide, 2,5-dimethyl-2,5-dihydroperoxyhexane;

dialkyl(and/or -aryl)peroxides ($R_1$—O—O—$R_2$), such as di-tert-butyl peroxide, 2,5-dimethylhexyne(3)-2,5-di-tert-butyl peroxide, di(2-tert-butylperoxyisopropyl) benzene, tert-butyl cumyl peroxide, dicumyl peroxide;

peroxycarboxylic acids ($R_1$—C(O)—O—OH), such as peracetic acid, performic acid;

peroxycarboxylic esters ($R_1$—C(O)—O—O—$R_2$), such as tert-butyl peroxypivalate, tert-butyl 2-ethylperoxyhexanoate, mono-tert-butyl peroxymaleate, bis(2-neodecanoylperoxyisopropyl)benzene;

diacyl peroxides ($R_1$—C(O)—O—O—C—(O)—$R_2$), such as dibenzoyl peroxide, di(3,5,5-trimethylhexanoyl) peroxide, 2,4-dichlorobenzoyl peroxide;

peroxycarbonate esters ($R_1$—O—C(O)—O—O—$R_2$), such as tert-butylperoxy isopropyl carbonate, tert-butylperoxy 2-ethylhexyl carbonate;

peroxydicarbonates ($R_1$—O—C(O)—O—O—C(O)—O—$R_2$), such as di(4-tert-butylcyclohexyl)peroxydicarbonate, di(2-ethylhexyl)peroxydicarbonate, dicetyl peroxydicarbonate;

ketone peroxides, such as cyclohexanone peroxide, methyl isobutyl ketone peroxide, methyl ethyl ketone peroxide, 3,3,5,7,7-pentamethyl-1,2,4-trioxepane, 3,6,9-triethyl-3,6,9-trimethyl-1,2,4,5,7,8-hexoxacyclononane;

perketals: 2,2-bis(tert-butylperoxy)butane, 1,1-di-tert-butylperoxy-3,3,5-trimethylcyclohexane, 1,1-bis(tert-butylperoxy)cyclohexane, 3,3,6,6,9,9-hexamethyl-1,2,4,5-tetraoxacyclononane, ethyl 3,3-di(tert-butylperoxy) butyrate;

other peroxide compounds, such as 3-tert-butylperoxy-3-phenylphthalide, tert-butylperoxyvalerolactone.

From the point of view of industrial availability, particular mention may be made of 1,1,3,3-tetramethylbutyl peroxyneodecanoate, 1,1-di(tert-butylperoxy)-3,3,5-trimethylcyclohexane, 1,1-di(tert-butylperoxy)cyclohexane, 2,2-di(tert-butylperoxy)butane, 2,5-dimethyl-2,5-di(tert-butylperoxy) hexane, 2,5-dimethyl-2,5-di(tert-butylperoxy)hex-3-yne, acetylacetone peroxide, cumyl peroxyneodecanoate, cyclohexanone peroxide, di(2,4-dichlorobenzoyl)peroxide, di(2-ethylhexyl)peroxydicarbonate, di(3,5,5-trimethylhexanoyl) peroxide, di(4-methylbenzoyl)peroxide, di(4-tert-butylcyclohexyl)peroxydicarbonate, di(tert-amyl)peroxide, di(tert-butyl)peroxide, dibenzoyl peroxide, dicetyl peroxydicarbonate, dicumyl peroxide, dilauroyl peroxide, dimyristyl peroxydicarbonate, disuccinoyl peroxide, methyl ethyl ketone peroxide, methyl isobutyl ketone peroxide, tert-amyl 2-ethylperoxyhexanoate, tert-amylperoxy 2-ethylhexyl carbonate, tert-amyl peroxybenzoate, tert-amyl peroxyneodecanoate, tert-amyl peroxypivalate, tert-butyl cumyl peroxide, tert-butyl hydroperoxide, tert-butyl 2-ethylperoxyhexanoate, tert-butylperoxy 2-ethylhexyl carbonate, tert-butyl 3,5,5-trimethylperoxyhexanoate, tert-butyl peroxyacetate, tert-butyl peroxybenzoate, tert-butyl peroxyisobutyrate, tert-butyl peroxyneodecanoate, tert-butyl peroxyneoheptanoate and tert-butyl peroxypivalate.

The organic peroxide can be present undiluted in the form of a solid or in the form of liquid. It can also be present together with a solvent in the form of solution, in the form of emulsion, in the form of suspension or in the form of paste. In one particularly preferred embodiment of the invention, the organic peroxide is a liquid peroxide.

Instead of the organic peroxide or together therewith, the composite material according to the invention can comprise initiators having labile carbon-carbon bonds (C—C initiators), selected from the group consisting of compounds having the general formula Ph-$R^4R^3$C—$CR^5R^6$-Ph, where Ph is a phenyl group or a substituted phenyl group and each of $R^3$, $R^4$, $R^5$ and $R^6$, independently of the others, is hydrogen or an alkyl group. Typical examples are 3,4-dimethyl-3,4-diphenylhexane, 2,3-dimethyl-2,3-diphenylbutane, 3,4-dimethyl-3,4-diphenylhexane, 2,3-dimethyl-2,3-diphenylbutane. Other compounds that can be employed as C—C initiators are oligomeric benzopinacole silyl ethers, benzpinacole disilyl ethers, these being monomeric or oligomeric, benzpinacole dimethyl ethers, tetraphenylethane and tetraphenylethane dinitrile.

The proportions present of the two constituents essential for the composite material according to the invention, the particles having a core-shell structure and the heat-activatable free-radical initiator, are preferably from 0.1 to 50% by weight for the particles having a core-shell structure and from 0.1 to 90% by weight for the heat-activatable free-radical initiator, based in each case on the composite material. The composite material according to the invention can be composed exclusively of these two constituents.

The composite material according to the invention can also comprise one or more polymers that are intended for crosslinking or polymers that are intended for hardening. By way of example, mention may be made of polyolefins, such as polyethylene, in particular LLDPE, LDPE, HDPE, polypropylene, polybutylene, and also copolymers thereof; ethylene-vinyl acetates; rubbers, such as ethylene-propylene-diene rubber, ethene-propene rubber, styrene-butadiene polymers, nitrile rubber, polybutadiene, silicone rubbers; thermoplastic elastomers, such as TPE-A, TPE-E, TPE-O, TPE-S, TPE-U, TPE-V; polyester resins, for example based on orthophthalic acid and neopentyl glycol; dicyclopentadiene resins, epoxy resins, vinyl ester resins, acrylates and methacrylates.

The proportion of polymer in the composite material according to the invention can preferably be from 1 to 99.8% by weight, based on the composite material.

In particular, composite materials that can be of interest are those that can be used as masterbatch and in which the proportion of core-shell particles is from 1 to 80% by weight, that of heat-activatable free-radical initiators is from 1 to 80% by weight and that of polymer is from 1 to 98% by weight, based in each case on the composite material. Particular preference can be given to an embodiment which comprises from 20 to 80% by weight of the core-shell particles, from 20 to 80% by weight of heat-activatable free-radical initiators, and from 20 to 80% by weight of polymer, based in each case on the composite material.

The composite material according to the invention can also comprise one or more substances that increase the degree of crosslinking or the degree of hardening. These can by way of example be polyfunctional acrylates and methacrylates, N,N-m-phenylenedimaleimide, 2,4,6-triallyloxy-1,3,5-triazine and/or 1,3,5-triallyl isocyanurate.

The composite material according to the invention can also comprise one or more solvents. These can by way of example be water, alcohols, diols, silicone oil, $C_5$-$C_{10}$ alkanes, and/or can be aromatic compounds.

In one particular embodiment of the invention, the composite material consists of
a) from 1 to 90% by weight, preferably from 20 to 80% by weight, of one or more heat-activatable free-radical initiators selected from the group consisting of organic peroxides and/or initiators having labile carbon-carbon bonds, b) from 1 to 90% by weight, preferably from 5 to 50% by weight, of particles which have a core-shell structure and in which the core comprises one or more magnetic materials, while the shell comprises silicon dioxide, c) from 0 to 99% by weight, preferably from 20 to 80% by weight, of one or more polymers intended for crosslinking or intended for hardening, d) from 0 to 90% by weight of one or more solvents, e) from 0 to 90% by weight of one or more substances that increase the degree of crosslinking or the degree of hardening, where all of the percentages are based on the composite material.

The invention further provides a process for producing the composite material, where a) one or more organic peroxides, one or more C—C initiators or a mixture of organic peroxides and of C—C initiators, b) particles having a core-shell structure, c) if appropriate, polymers intended for crosslinking or intended for hardening, d) if appropriate, solvents and e) if appropriate, one or more substances that increase the degree of crosslinking or the degree of hardening are mixed.

The organic peroxide or the C—C initiator here can be used in liquid, solid, dissolved, emulsified or suspended form. The core-shell particles can be used undiluted in solid form or in dispersed form.

Assemblies known to the person skilled in the art can be used, examples being roll mills, kneading systems, such as internal mixers, Co-kneaders, Z-blade mixers, single- and multiscrew extrusion plants, powder mixers, such as tumbling mixers and drum mixers, and/or agitators.

The invention further provides the use of the composite material according to the invention for the crosslinking and hardening of polymers. The polymers are the same as those mentioned as possible ingredients of the composite material.

Inductive heating of the mixture takes place here. Inductive heating here means that the mixture is exposed to an alternating magnetic or electromagnetic field. Familiar inductors within the medium-frequency range of from 100 Hz to 100 kHz, or within the high-frequency range of from 10 kHz to 60 MHz, are suitable for this purpose. The composite material according to the invention permits efficient introduction of this energy. The shell of the core-shell particles used here inhibits premature decomposition of the free-radical initiators, without making it more difficult to introduce the energy.

EXAMPLES

Starting Materials

Core-Shell Particles

Example 1

One stream consists of a mixture in the form of vapour made of 0.49 kg/h of $SiCl_4$ and 0.05 kg/h of monosilane and a second stream in the form of an aerosol which is obtained at room temperature (23° C.) by means of a two-fluid nozzle, consists of a 25 percent strength by weight solution iron(II) chloride, corresponding to 1.55 kg/h of iron(II) chloride, in water, and 5 $Nm^3$/h of nitrogen as spraying gas, and these streams are introduced separately into the mixing zone of a reactor.

This mixture is reacted in the combustion zone of the reactor in a flame generated by igniting a mixture of 7.9 $Nm^3$/h of hydrogen and 21 $Nm^3$/h of air. The residence time of the reaction mixture in the combustion zone is about 40 ms.

In the cooling zone that follows the combustion zone, the reaction mixture is cooled to 332° C. by introducing 8 kg/h of water.

The resultant solid is separated from the gaseous substances on a filter.

Example 2

Is the same as Example 1 except that the proportions of silicon tetrachloride, monosilane, hydrogen and air are altered.

Table 1 gives the reaction parameters for Examples 1 and 2 and Table 2 gives the physicochemical values for the resultant powders.

TABLE 1

| Reaction parameters | | | |
|---|---|---|---|
| Example | | 1 | 2 |
| $SiCl_4$ | kg/h | 0.17 | 0.62 |
| $SiH_4$ | kg/h | 0.01 | 0.02 |
| Hydrogen | $Nm^3$/h | 4.8 | 7.9 |
| Air | $Nm^3$/h | 12.5 | 21 |
| Aerosol | | | |
| Conc. $FeCl_2$ solution | % by wt. | 25 | 25 |
| $FeCl_2$ | kg/h | 0.6 | 1.85 |
| Nitrogen | $Nm^3$/h | 3 | 5 |
| T(Aerosol)[1] | ° C. | 23 | 23 |
| Adiabatic temp. | ° C. | 1150 | 1250 |
| Residence time[2] | ms | 60 | 43 |
| Cooling water | kg/h | 7 | 7 |
| Temperature[3] | ° C. | 332 | 337 |

[1] on entry to mixing zone;
[2] in combustion zone;
[3] after cooling;

TABLE 2

| Physicochemical data for the powders | | | |
|---|---|---|---|
| Example | | 1 | 2 |
| BET surface area | $m^2$/g | 40 | 60 |
| Average particle diameter | nm | 11 | 16 |
| 90% spread of proportional distribution | nm | 5-20 | 8-24 |
| Thickness of shell | nm | 2-15 | 3-8 |
| Silicon dioxide | % wt. | 17.4 | 19.3 |
| Maghemite/magnetite/hematite | % wt. | 57/38/5 | 7/85/7 |
| Maghemite/magnetite/hematite[1] | Å | 325/525/870 | —[2]/325/375 |

[1] Magnetite, hematite ±5%, maghemite ±10%;
[2] crystallite size cannot be determined because of the low proportion of maghemite Peroxides:

Dicumyl peroxide (DCUP, CAS 80-43-3), in crystalline form regarded as pure for industrial purposes.

2,5-Dimethyl-2,5-di(tert-butylperoxy)hex-3-yne (DYBP-85-WO, CAS 1068-27-5), present in phlegmatized form with 75% content in white oil.

2,4-Dichlorobenzoyl peroxide (DCLBP-50-PSI, CAS 133-14-2), crystalline peroxide phlegmatized in 50% of silicone oil.

2,5-Dimethyl-2,5-di(tert-butylperoxy)hexane (DHBP, CAS 78-63-7), peroxide in liquid form regarded as pure for industrial purposes (about 92%).

Tert-butyl perbenzoate (TBPB, CAS 614-45-9), peroxide in liquid form regarded as pure for industrial purposes (about 96%).

Polymers:

LDPE: Lupolen 1800Sp, Basell, injection-moulding grade, MFI 17-22; HDPE: Lupolen 4261A, Basell, pipe-extrusion grade, MFI 2-4; EVA: Elvax® PV1400, DuPont, specialty grade for photovoltaic applications.

Example 3

100 g of tert-butyl perbenzoate (liquid component) and 100 g of the particles from Example 1 are mixed for 20 min in a blade mixer (Beken kneader) to give a dry, flowable and dust-free composite material.

Example 4

60 g of the particles from Example 2 and 140 g of tert-butyl perbenzoate (liquid component) are mixed for 20 min in a blade mixer (Beken kneader) to give a highly viscous paste.

Example 5

Composite materials consisting of LDPE (Lupolen 1800Sp), and respectively 2%, 3% and 10% of the particles from Example 1 and of peroxide content which is respectively 1% of dicumyl peroxide (DCUP) and also 1% of 2,5-dimethyl-2,5-di(tert-butylperoxy)hex-3-yne (DYBP-85-WO), based on LDPE, are produced at 70 rpm by way of a strand die using a melt temperature of 115° C. in a 25 mm laboratory extruder (Collin, thermoplastic screw).

Heating of strand sections in high-frequency magnetic field: a strand section of length 3 cm from the extrusion example (Example 5, 1% of DYBP-85-WO), preheated to about 75° C., is positioned in the high-frequency magnetic field (Tesla coil of diameter about 4 cm, HF generator, power rating 25 kW at 650 kHz, Celes). The generator is operated for a period of 10 s using 50% of its power rating and then for a period of 50 s with 3% of its power rating. With the first power setting the surface temperature of the strand specimen rises to 230° C., and with the second power setting it rises gradually to 245° C. The desired high degree of crosslinking is obtained here.

Example 6

100 g of 2,4-dichlorobenzoyl peroxide (paste form) and 100 g of the particles from Example 1 are mixed for 20 min in a blade mixer (Beken kneader) to give a dry, flowable 25-percent-strength composite material.

Example 7

The storage stability of a composite material obtained from a 60-Shore silicone rubber and 2% by weight of the composite material from Example 4 is tested. Rheometer measurements (Goettfert Viscoelastograph) after 2 and 4 weeks reveal no significant alteration in crosslinking time or reduction in effectiveness of crosslinking. The torque rose slightly by virtue of the usual slight increase in viscosity due to storage, from 1.80 to 1.87 Nm.

Diacyl peroxides are particularly sensitive. This composite material can therefore be taken as an example of maximum potential storage difficulty.

Example 8

65 parts of EVA PV1400 (DuPont), 15 parts of DHBP and 20 parts of the particles from Example 1 were kneaded in a cam-type kneader (Brabender, 300 cm³ chamber) at 70° C. to give a non-dusting, rubbery composite material.

The invention claimed is:

1. A process for crosslinking and hardening a polymer, comprising crosslinking and hardening the polymer by inductive heating with a composite material comprising:
   at least one heat-activatable free-radical initiator selected from the group consisting of an organic peroxide and an initiator comprising a labile carbon-carbon bond,
   particles comprising: (i) a core comprising a magnetic material, and (ii) a shell comprising silicon dioxide, wherein the content of the core is 50-90% by weight and 50-90% by weight of the shell, based on the weight of the particles, and
   at least one polymer in a proportion of 1 to 99.8 wt. % based on said composite material.

2. The process of claim 1,
   wherein a thickness of the shell is from 2 to 500 nm.

3. The process of claim 1,
   wherein the core comprises an iron oxide.

4. The process of claim 1,
   wherein the particles are surface-modified.

5. The process of claim 1,
   wherein the at least one heat-activatable free-radical initiator is an organic peroxide which comprises an organic peroxide selected from the group consisting of a hydroperoxide, a dialkyl peroxide, a diaryl peroxide, a peroxycarboxylic acid, a peroxycarboxylic ester, a diacyl peroxide, a peroxycarbonate ester, a peroxydicarbonate, a ketone peroxide, a perketal and a mixture thereof.

6. The process of claim 1,
   wherein said heat-activatable free-radical initiator comprises an initiator comprising a labile carbon-carbon bond which is at least one initiator of formula Ph-R$^4$R$^3$C—CR$^5$R$^6$-Ph,
   wherein Ph is a phenyl group or a substituted phenyl group and
   R$^3$, R$^4$, R$^5$, and R$^6$ are each independently hydrogen or an alkyl group.

7. The process of claim 1,
   wherein a proportion of the particles is from 0.1 to 60% by weight and a proportion of the at least one heat-activatable free-radical initiator is from 0.1 to 90% by weight, based on the composite material.

8. The process of claim 1,
   wherein a proportion of the particles is from 20 to 80% by weight, a proportion of the at least one heat-activatable free-radical initiator is from 20 to 80% by weight, and a proportion of said at least one polymer is from 20 to 80% by weight, based in each case on the composite material.

9. The process of claim 1,
   wherein said composite material further comprises a substance capable of increasing a degree of crosslinking or a degree of hardening.

10. The process of claim 1,
    wherein said composite material further comprises a solvent.

11. The process of claim 1, wherein the core consists of at least one iron oxide.

12. The process of claim 1, wherein the core consists of hematite, magnetite, maghemite, or a mixture thereof.

13. The process of claim 1, wherein a BET surface area of the particles is from 5 to 500 m²/g.

14. The process of claim 1, wherein said at least one polymer is at least one polymer selected from the group consisting of a polyolefin, an ethylene-vinyl acetate, a rubber, a thermoplastic elastomer, a polyester resin, a dicyclopentadiene resin, an epoxy resin, a vinyl ester resin, an acrylate and a methacrylate.

15. The process of claim 1, wherein said at least one polymer is at least one polymer selected from the group consisting of polyethylene, polypropylene, polybutylene, ethylene-propylene-diene rubber, ethene-propene rubber, styrene-butadiene polymer, nitrile rubber, polybutadiene, silicone rubber, TPE-A, TPE-E, TPE-O, TPE-S, TPE-U, TPE-V and an orthophthalic acid and neopentyl glycol polyester.

* * * * *